United States Patent [19]

Kondoh

[11] Patent Number: 5,218,186
[45] Date of Patent: Jun. 8, 1993

[54] FILM STORAGE DEVICE

[75] Inventor: Masahiko Kondoh, Kanagawa, Japan

[73] Assignee: Fuji Photo Film Co., Ltd., Kanagawa, Japan

[21] Appl. No.: 726,096

[22] Filed: Jul. 5, 1991

Related U.S. Application Data

[62] Division of Ser. No. 574,847, Aug. 30, 1990.

[30] Foreign Application Priority Data

Aug. 31, 1989 [JP] Japan .................................. 1-227928
Aug. 31, 1989 [JP] Japan .................................. 1-227929

[51] Int. Cl.⁵ .............................................. G06F 15/20
[52] U.S. Cl. ...................................... 235/375; 235/381
[58] Field of Search ................. 235/375, 381; 355/40, 355/41; 354/105; 364/525

[56] References Cited

U.S. PATENT DOCUMENTS

| | | | |
|---|---|---|---|
| 4,724,463 | 2/1988 | Matsumoto | 355/41 |
| 4,817,023 | 3/1989 | Yamaguchi et al. | 355/40 |
| 4,862,222 | 8/1989 | Staude et al. | 355/41 |
| 4,881,090 | 11/1989 | Signoretto | 355/40 |

*Primary Examiner*—Harold Pitts
*Attorney, Agent, or Firm*—Sughrue, Mion, Zinn, Macpeak & Seas

[57] ABSTRACT

A film storage device for storing films fed by a feed system in a magazine includes a pressing mechanism, angularly displaced with respect to a direction in which a film is fed, for pressing the film into the magazine, a film feeder coupled to the pressing mechanism and angularly movable for forcibly delivering the film into the magazine along the direction, and a drive mechanism for moving the pressing means into the magazine. The film storage device also has a system for storing and displaying the number of films stored in the magazine, and also for detecting a mismatch between the types of the cassette and the magazine.

8 Claims, 12 Drawing Sheets

| $S_1$ (344a) | $S_1$ (344b) | CASSETTE CS |
|---|---|---|
| L | L | NO |
| L | H | $CS_1$ |
| H | L | $CS_2$ |
| H | H | $CS_3$ |

| $S_3$ (348a) | $S_4$ (348b) | MAGAZINE MZ |
|---|---|---|
| L | L | NO |
| L | H | $MZ_1$ |
| H | L | $MZ_2$ |
| H | H | $MZ_3$ |

| CASSETTE CS | MAGAZINE MZ |
|---|---|
| $CS_1$ | $MZ_1$ |
| $CS_2$ | $MZ_2$ |
| $CS_3$ | $MZ_3$ |

| MAGAZINE MZ | NUMBER X OF STORED FILMS | MAXIMUM NUMBER Y OF STORABLE FILMS |
|---|---|---|
| $MZ_1$ | $X_1$ | $Y_1$ |
| $MZ_2$ | $X_2$ | $Y_2$ |
| $MZ_3$ | $X_3$ | $Y_3$ |

| | FILM F |
|---|---|
| 354 ($S_5$) | H | YES |
| 356 ($S_6$) | L | NO |

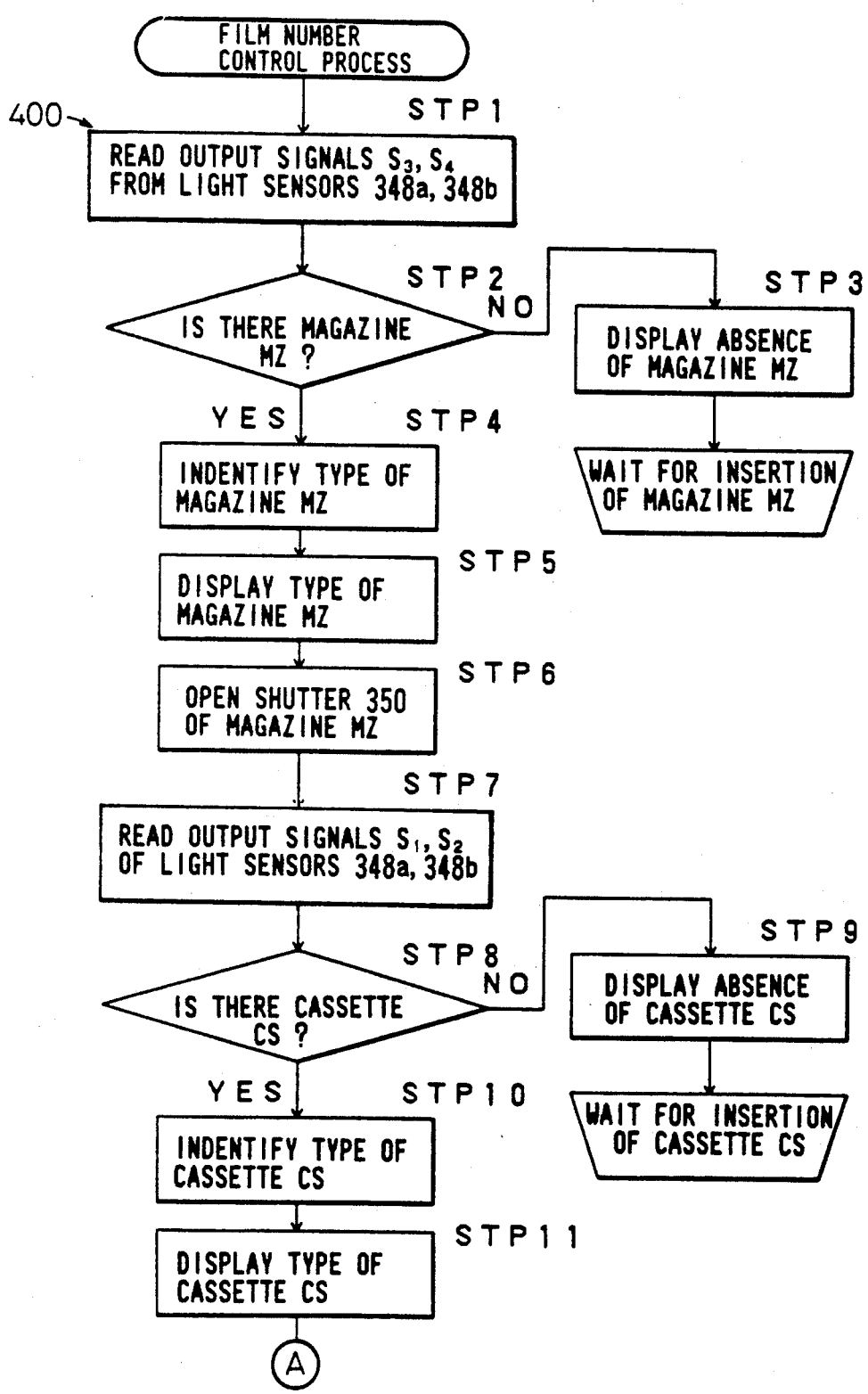

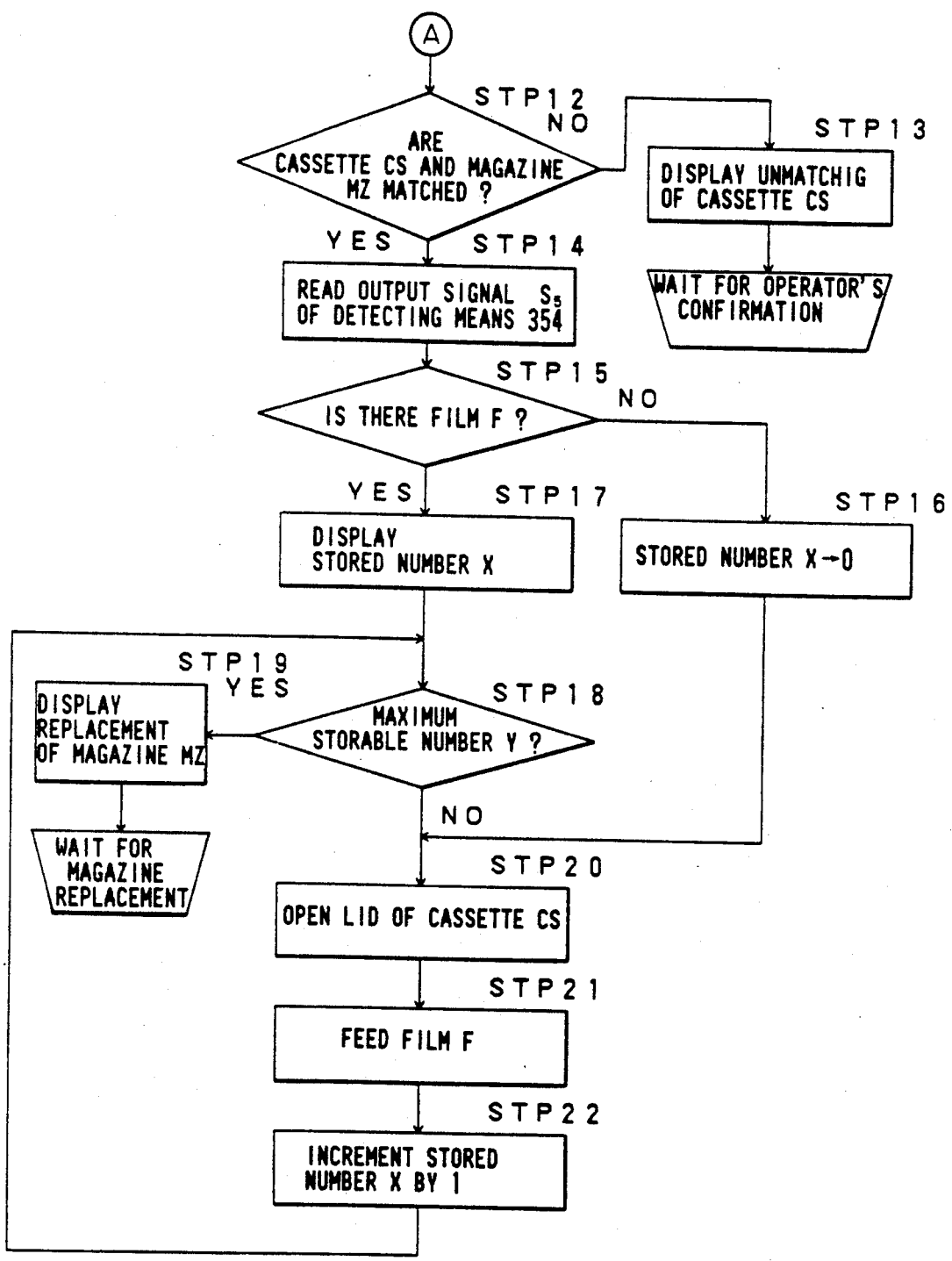

FILM STORAGE DEVICE

This is a divisional of application Ser. No. 07/574,847 filed Aug. 30, 1990.

BACKGROUND OF THE INVENTION

The present invention relates to a film storage device for placing a number of films taken out of a cassette as stacked films in a magazine.

Heretofore, a film which has been exposed to an X-ray image and which has not yet been developed is placed in a cassette in a light-shielding condition, and the cassette is accommodated into a given device. After the film is taken out of the cassette and placed in a magazine, the empty cassette is removed from the above device. Such a device is widely employed in mammographic imaging systems.

The relationship between the device and a mammographic imaging system will be described below with reference to FIG. 1 of the accompanying drawings.

Films a which are stacked in an envelope are placed in a magazine b in a bright room, and the magazine c is then accommodated in a loading device b. An empty flat cassette d is also accommodated in the loading device c. If films a' of a different size are also involved, the films a' are placed in a magazine b' in a bright room, and the magazine b' and an empty cassette d' are accommodated in another loading device c'. In the loading device c, an unexposed film a is transferred from the magazine b into the cassette d by a feed mechanism (not shown). Then, the cassette d which loads the film a in a light-shielding condition is taken out of the loading device c. Likewise, an exposed film a' is transferred from the magazine b' into the cassette d' which is taken out of the loading device c'. The films a, a' in the flat cassettes d, d' are used to photograph an object such as a woman's chest to check for a breast cancer, for example.

The cassettes d, d' (referred to as cassettes f, f'), which pace the exposed films a, a' therein, are then accommodated in a film removal device g associated with an automatic photographic processor. In the film removal device g, the films a, a' are taken out of the cassettes f, f'. The films a, a' are thereafter sent to the automatic photographic processor and developed into X-ray photographs. Alternatively, the cassettes f, f' are placed in a film storage device h which is not associated with an automatic photographic processor. In the film storage device h, the films a, a' are stacked in magazines i, i' by film delivery mechanisms. Then, the magazines i, i' are accommodated in a film feed device j associated with an automatic photographic processor, and the films a, a' are taken out of the magazines i, i' and sent to the automatic photographic processor. The films a, a' are thereafter developed into X-ray photographs by the automatic photograpic processor.

When films are successively placed as stacked films into a magazine, the magazine is generally held horizontally. Therefore, a film delivery mechanism combined with the magazine is also required to deliver the films horizontally into the horizontal magazine. As a result, the film delivery mechanism has a large horizontal extent.

Attempts have been made to hold a magazine vertically and place films into the vertical magazine from an opening defined in an upper side of the magazine. Films which are to be placed in a magazine are of various sizes. When such a magazine is accommodated in an automatic photographic processor, it is extremely difficult to take films of smaller sizes out of the magazine from the upper opening thereof. In view of the difficulty of taking out smaller films, the magazine has a large film removal opening defined below the upper opening, and the film removal opening is usually closed by a shutter on the magazine. Consequently, the magazine itself is expensive, cannot easily handled as it is heavy, and is complex in structure.

In the film storage device h, it is necessary to transfer the films a, a' of different sizes from the cassettes f, f' to the magazines i, i' of corresponding sizes.

It has been customary to manually check the number of films stored in the magazines i, i' and also to manually match the types of the magazines i, i' in the film storage device h to the types of the cassettes f, f'.

The manual processes of checking the number of film stored and matching the cassette and magazine types are however quite tedious and laborious, and hence highly costly.

SUMMARY OF THE INVENTION

It is a main object of the present invention to provide a film storage device which is of a simple construction, can reliably feed films from a cassette into a magazine, and is small in size.

Another object of the present invention is to provide a film storage device which can automatically match cassette and magazine types and automatically check the number of films stored in a magazine.

Still another object of the present invention is to provide a film storage device for storing films fed by a feed system in a magazine, comprising pressing means, angularly displaced with respect to a direction in which a film is fed, for pressing the film into the magazine, feeding means coupled to the pressing means and angularly movable for forcibly delivering the film into the magazine along the direction, and drive means for moving the pressing means into the magazine.

Yet another object of the present invention is to provide the film storage device wherein the feeding means has a curved surface pivotally supported on the pressing means and angularly movable with respect to the direction, the curved surface being normally directed with respect to the pressing means to project toward the magazine, and being angularly movable along the direction to deliver the film into the magazine after having engaged the film.

Yet still another object of the present invention is to provide the film storage device wherein the feeding means comprises a semicircular member pivotally supported at an eccentric position thereof on the pressing means.

A further object of the present invention is to provide a film storage device comprising a magazine for storing a plurality of films, and accommodating means for accommodating the magazine therein, the magazine having an identification indicia for identifying the type of the magazine, the accommodating means comprising first detecting means for detecting the identification indicia on the magazine, second detecting means for detecting whether a film is stored in the magazine or not, third detecting means for detecting a film when the film is placed in the magazine, memory means for storing the number of films stored in the magazine, and control means, electrically connected to the first, second, and third detecting means and responsive to output signals from the first, second, and third detecting means, for storing the number of films in the magazine in the memory means.

A still further object of the present invention is to provide a film storage device comprising a cassette for storing a single film, a magazine for storing a plurality of films, the magazine corresponding in type to the cassette, and accommodating means for accommodating the cassette and the magazine therein, the cassette having an identification indicia A for identifying the type of the cassette, the magazine having an identification indicia B for identifying the type of the magazine, the accommodating means comprising detecting means A for detecting the identification indicia A on the cassette, detecting means B for detecting the identification indicia B on the magazine, detecting means C for detecting whether a film is stored in the magazine or not, detecting means D for detecting a film when the film is transferred from the cassette to the magazine, memory means for storing the number of films stored in the magazine, and control means, electrically connected to the detecting means A, B, C, D and responsive to output signals from the detecting means A, B, C, D, for detecting a mismatch between the types of the cassette and the magazine and for storing the number of films in the magazine in the memory means.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 10a through 10d are display tables, the display tables being stored in a RAM in the device shown in FIG. 9;

FIG. 11 is a table of data for determining whether there is a film or not, the table being stored in the RAM in the device shown in FIG. 9; and FIG. 12 is a flowchart of a program stored in a ROM in the device shown in FIG. 9.

DETAILED DESCRIPTION OF THE PREFERRED EMBODIMENT

Figure 2:
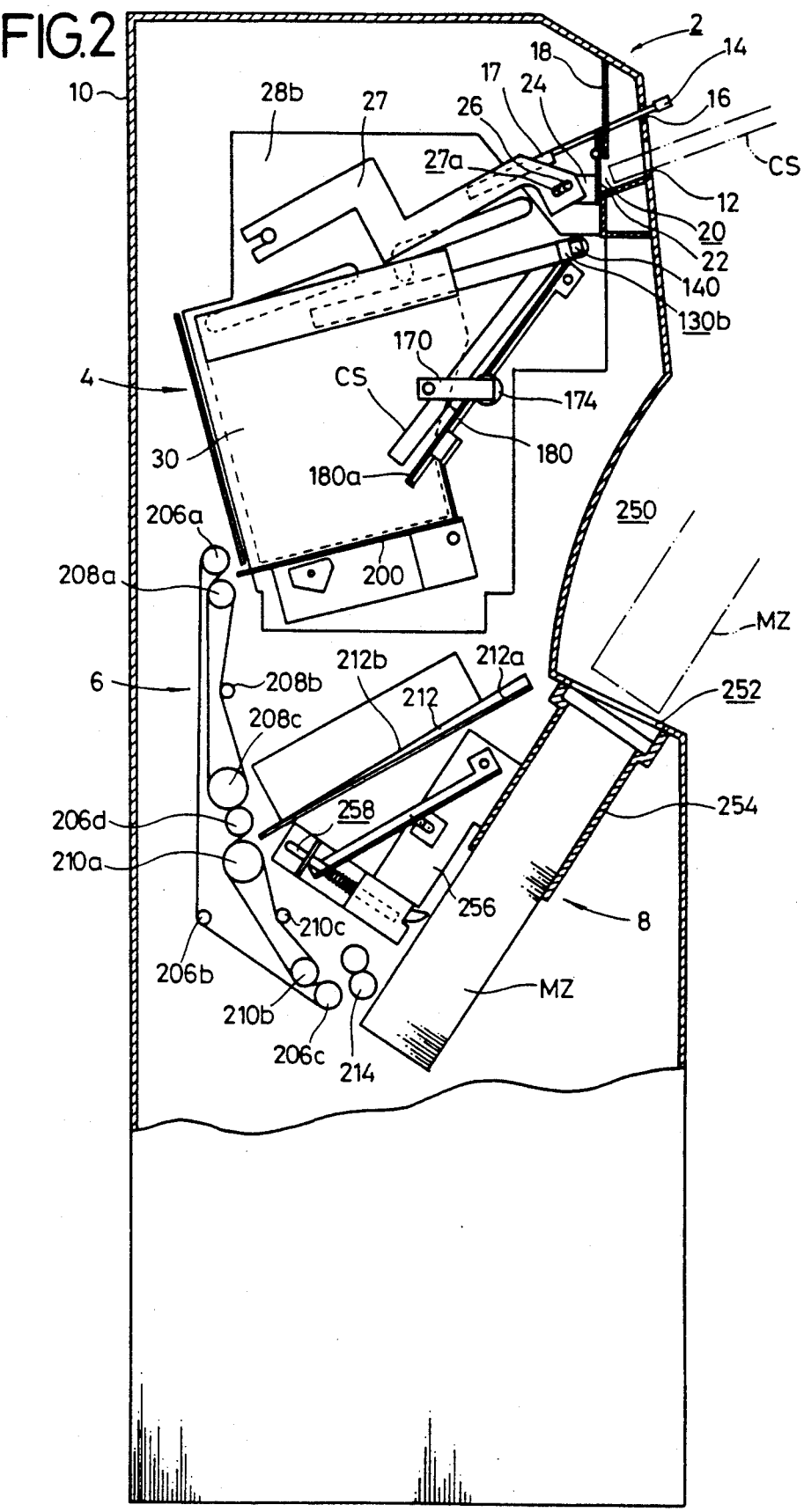
FIG. 2 is a schematic vertical cross-sectional view of a film storage device according to the present invention.

FIG. 2 shows a film storage device 2 according to the present invention. The film storage device 2 generally comprises a film cassette accommodating and unloading mechanism 4, a feed system 6 for feeding an exposed film from the film cassette accommodating and unloading mechanism 4, and a magazine accommodating mechanism 8 for inserting a magazine which stores stacked films fed one by one by the feed system 6, the magazine accommodating mechanism 8 being coupled to a film feeding and storing mechanism.

First, the film cassette accommodating and unloading mechanism 4 will be described below. The film cassette accommodating and unloading mechanism 4 includes a vertically long housing 10 which has an opening 12 defined in an upper side wall thereof for inserting a cassette CS therethrough and a narrower opening 16 defined in the upper side wall immediately above the opening 12, the opening 16 receiving a displaceable lever 14 extending therethrough which lever 14 can be manipulated from outside of the housing 10. The lever 14 has an inner distal end to which there is connected a channel-shaped displaceable member 17 which is open downwardly. A vertical plate 18 extends downwardly from the upper side wall of the housing 10 closely to the opening 12. The plate 18 defines an opening 20 that can be opened and closed by a shutter 22 which is joined to a bracket 24 having a projecting pin 26. The pin 26 is disposed in a hole 27a defined in one end of a shutter opening arm 27 of a bent configuration which is angularly movably supported on a side plate 28b (described below).

Figure 3:
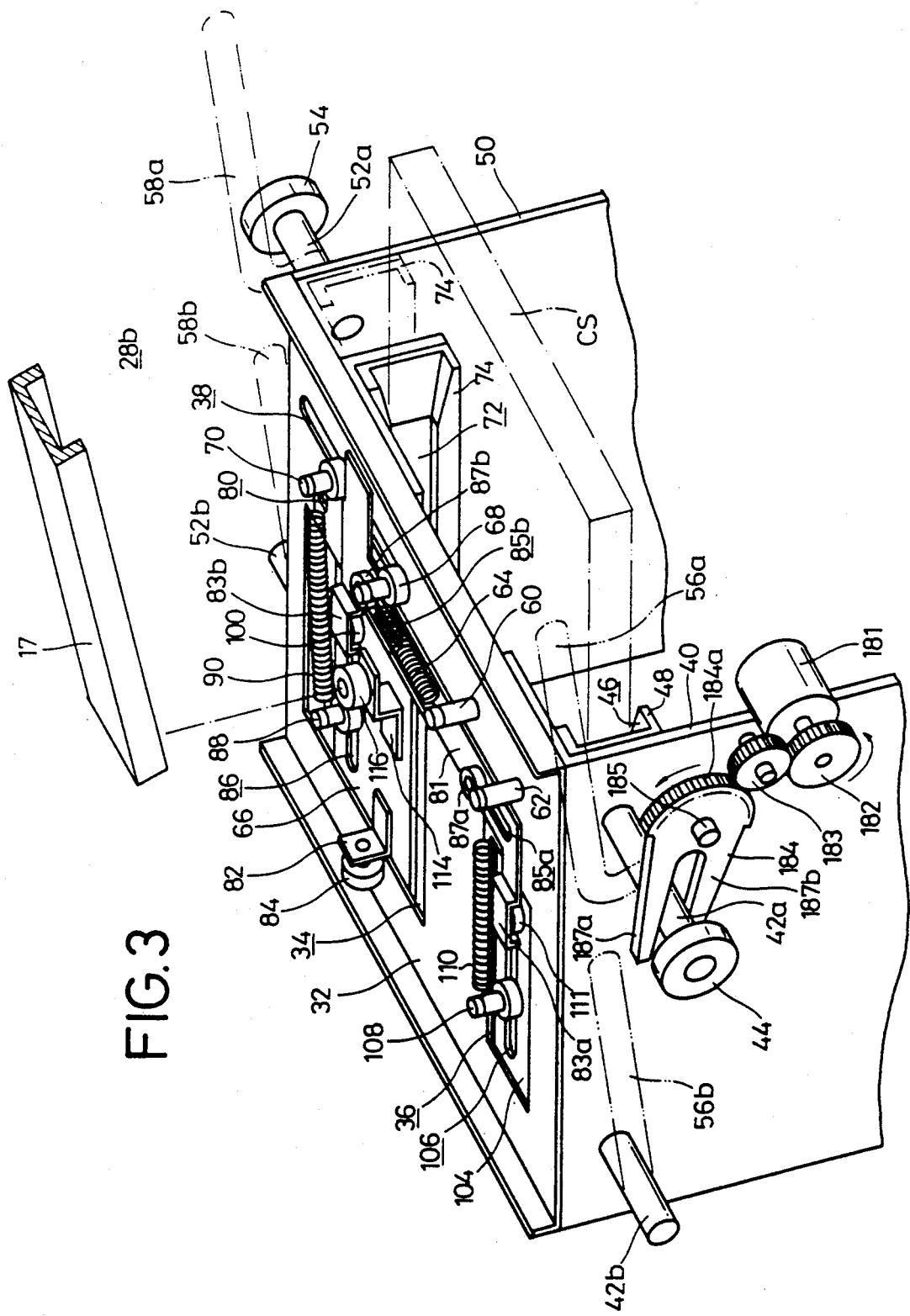
FIG. 3 is a fragmentary perspective view of a cassette holder in the film storage device.

A pair of vertical side plates 28a, 28b is disposed in an upper portion of the housing 10, and a cassette holder 30 is positioned between the side plates 28a, 28b. As shown in FIG. 3, the cassette holder 30 includes a plate 32 having opposite ends bent upwardly and also having large openings 34, 36 defined therein, the openings 34, 36 being spaced from each other. The plate 32 also has a slot 38 defined in a longitudinal end thereof near the opening 34. An attachment member 40 of a bent configuration is joined to one side of the plate 32, and two pins 42a, 42b which are spaced from each other are mounted on opposite ends of the attachment member 40, the pins 42a, 42b projecting outwardly. A roller 44 is mounted on the outer end of the pin 42a. A fixed channel-shaped guide 48 is secured to an inner surface of the attachment member 40. The guide 48 has a guide groove 46 defined therein.

Another attachment member 50 is secured to the opposite side of the plate 32 remotely from the attachment member 40. The attachment member 50 supports two pins 52a, 52b aligned with the pins 42a, 42b, respectively, and projecting outwardly. A roller 54 is mounted on the outer end of the pin 52a. The pins 42a, 42b engage in a curved slot 56a and a straight slot 56b, respectively, the slots 56a, 56b being defined in the side plate 28a, and the pins 52a, 52b engage in a curved slot 58a and a straight slot 58b, respectively, the slots 58a, 58b being defined in the side plate 28b.

A pin 60 projects upwardly from the upper surface of the plate 32, and another pin 62 also projects upwardly from the upper surface of the plate 32 near the pin 60. One end of a coil spring 64 is connected to the pin 60, and the other end of the coil spring 64 is connected to a pin 68 which projects upwardly from a plate 66 beneath the plate 32 through the slot 38. The plate 66 also supports another pin 70 projecting upwardly through the slot 38 and spaced from the pin 68.

The plate 66 includes a downwardly bent portion to which there is fixed a movable guide 74 having a guide groove 72. The movable guide 74 supports a pin 76 (FIG. 4) projecting from an upper portion of one end thereof, and a locking finger 78 is pivotally mounted on the pin 76. When a cassette is inserted between the fixed guide 48 (FIG. 3) and the movable guide 74 through the guide grooves 46, 72, an end of the cassette near the guide groove 72 turns the locking finger 78 upwardly. A distal end of the locking finger 78 thus turned extends through a hole (not shown) defined in the plate 66 and engages in a locking hole 80 which is defined in the plate 32. Therefore, the movable guide 74 is locked by the locking finger 78 against movement in the longitudinal direction thereof in FIG. 3.

An angle 82 having one end projecting upwardly is mounted on the plate 66 and supports a rotatable roller 84 which can roll on the plate 32. The plate 66 has a slot 86 defined therein in the longitudinal direction thereof, i.e., perpendicularly to the slot 38. A pin 88 extends upwardly through the slot 86 and has an upper end engaged by one end of a coil spring 90, whose other end is connected to the pin 70.

A cassette displacement limiting member 81 is mounted on the plate 82 near the pins 60, 68. The cassette displacement limiting member 81 has two bent portions 83a, 93b on respective bent opposite ends thereof, the bent portions 83a, 83b defining downwardly open spaces. The cassette displacement limiting member 81 also has two slots 85a, 85b defined therein in the longitudinal direction thereof. Cylindrical collars 87a, 87b have respective shafts extending downwardly through the slots 85a, 85b, respectively.

Figure 4:
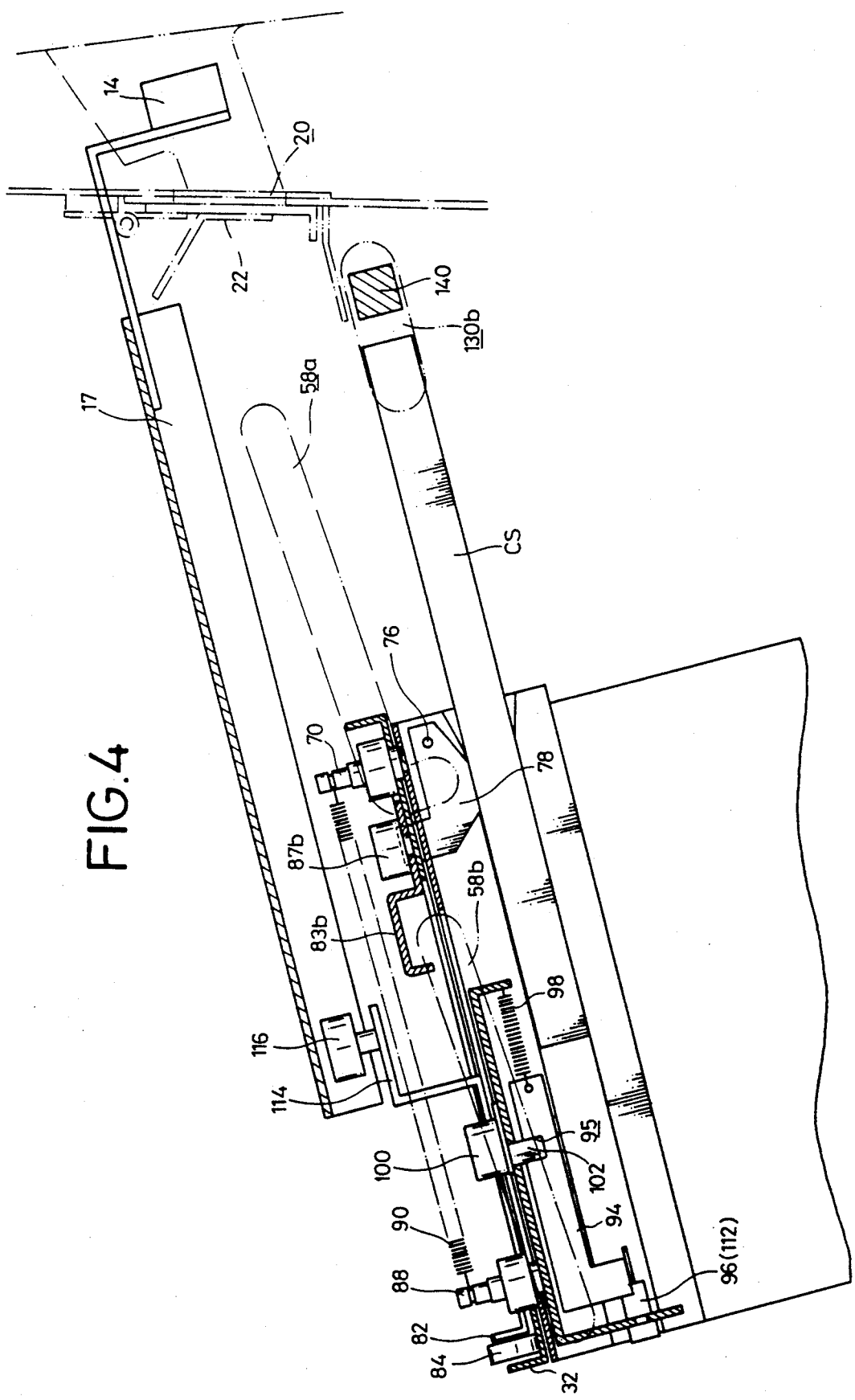
FIG. 4 is a vertical cross-sectional view of the cassette holder.

As shown in FIG. 4, the pin 88 extends downwardly from the slot 86 and has a lower end coupled to a plate 92 which has a downwardly bent portion. The plate 92 serves to hold a sensor actuator 94 and an unlocking pin 96. The sensor actuator 94 has a recess 95 defined in an upper longitudinal edge thereof between opposite ends thereof, with one of the ends being engaged by one end of a coil spring 98. The other end of the coil spring 98 is connected to one end of the plate 92.

A sensor 102 in the form of a photointerrupter is mounted on the plate 66. A collar 100 for engaging the cassette displacement limiting member 81 projects upwardly from the slot 86.

As shown in FIG. 3, a plate 104 is positioned beneath the opening 36 and has a slot 106 through which a pin 108 projects, the pin 108 being identical to the pin 88. A coil spring 110 extends between the pins 108, 62. Although not shown, the pin 108 holds a plate which is the same as the plate 92, and the plate supports a collar 111 and an unlocking pin 112. The collar 111 and the unlocking pin 112 are identical to the collar 100 and the unlocking pin 96, respectively.

A bent member 114 is fixedly mounted on the plate 66 in spaced-apart relation to the angle 82. A roller 116 is rotatably mounted on an upper distal end of the bent member 114.

The side plates 28a, 28b will be described below in more detail. The side plates 28a, 28b have relatively short, inclined slots 130a, 130b (see FIGS. 2, 4, and 5) defined therein below the slots 56a, 58a. An unlocking bar 140 extends between and through the slots 130a, 130b. One end of an arm 142 is pivotally supported on the unlocking bar 140, the arm 142 having a long groove 144 defined longitudinally in its opposite end (see FIG. 5). The long groove 144 is positioned near an unlocking link 146 which has a pin 150 displaced off center from a shaft 148 thereof. The pin 150 supports on its end a roller 152 which is normally biased toward the bar 140 by a tension spring 156, one end of which engages a pin 154 mounted on the arm 142. The link 146 has a coaxial sprocket 158 positioned near an idler sprocket 160. A sprocket 162 is disposed below the arm 142. An endless chain 166 is trained around a sprocket 165 mounted on the rotatable drive shaft of a motor 164, the sprocket 162, the sprocket 158, and the idler sprocket 160. The sprocket 162 has a shaft 168 on which there is pivotally supported a link 174 with a roller 174 rotatably mounted thereon. When the motor 164 is energized, the sprocket 165 is rotated to cause the chain 166 to rotate the sprocket 158, the sprocket 168, and the idler sprocket 160.

As shown in FIG. 2, the roller 174 engages a flange 180a extending outwardly from a plate 180 for closing the lid of the cassette CS, the plate 180 being pivotally supported at one end thereof near and below the unlocking bar 140. Therefore, when the link 170 rotates, the lid closing plate 180 is angularly moved by the roller 174.

A motor 181 (FIG. 3) is disposed near the side plate 28a and has a rotatable drive shaft supporting a gear 182 which meshes with a gear 183. The gear 183 is held in mesh with teeth 184a on a semicircular edge of a drive fork 184. The drive fork 184 is supported on a shaft 185 which extends toward the side plate 28b and supports another drive fork (not shown) on its opposite end. The drive fork 184 has two fingers 187a, 187b sandwiching the pin 42a, and the other drive fork has two fingers (not shown) sandwiching the pin 52a.

Figure 6:
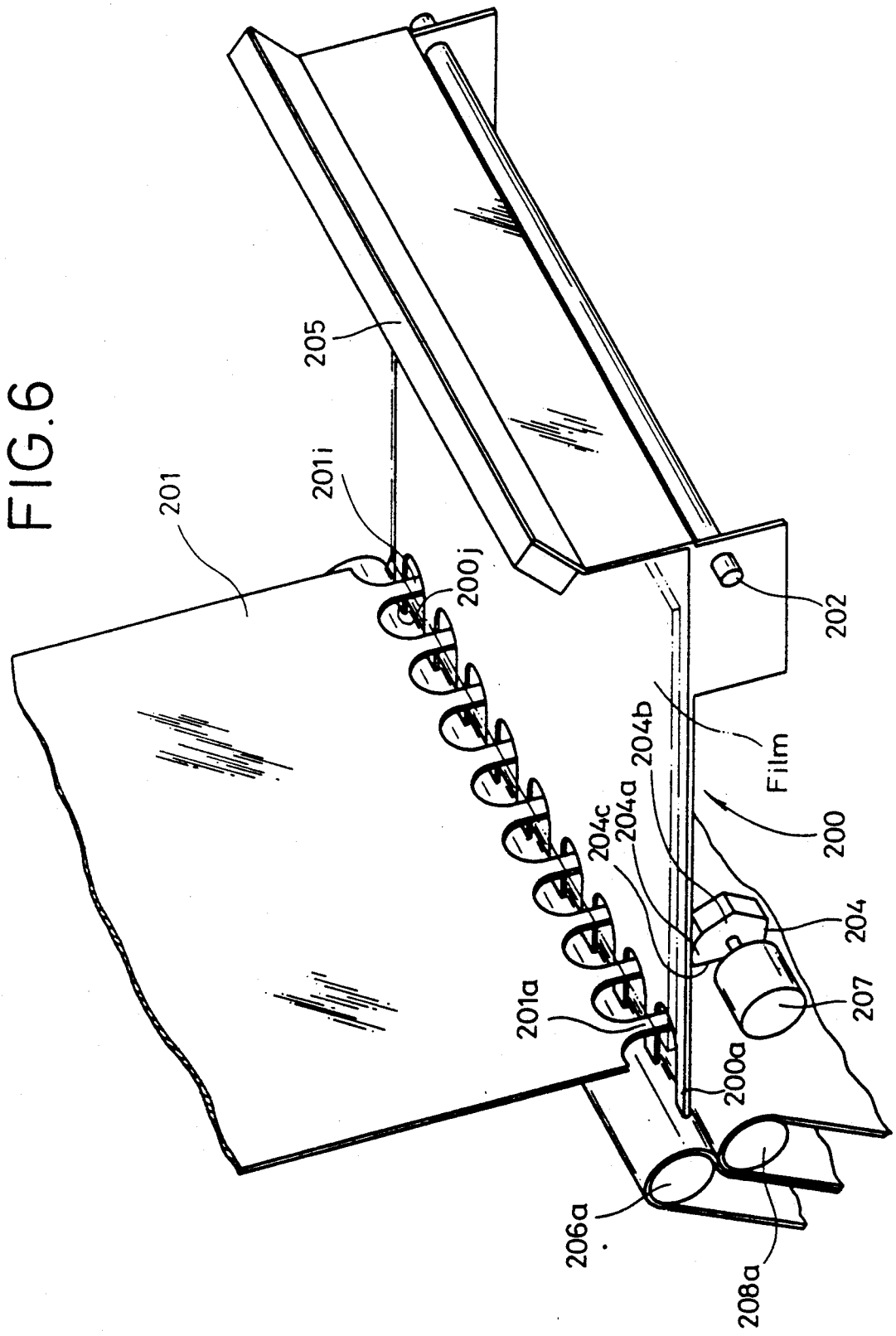
FIG. 6 is a perspective view of a film guide plate in the film storage device.

The lid closing plate 180 serves to guide a film taken out of a cassette CS when the lid closing plate 180 is in an open position. When the lid closing plate 180 is in the open position, the distal end of the lid closing plate 180 is directed toward a swingable guide 200. As shown in FIG. 6, the guide 200 has a plurality of teeth 200a through 200j on its distal end which are held in mesh with teeth 201a through 201j on the distal end of a plate 201. The other end of the guide 200 is pivotally supported on a shaft 202. The guide member 200 has an upturned portion extending from the other end thereof remote from the teeth 200a through 200j and supporting thereon a receiver pad 205 for the lid closing plate 180. The guide 200 has a lower surface engaged by a rotor 204 of a deformed pentagonal shape near the toothed end, the rotor 204 being rotatable by a motor 207. The rotor 204 has a curved portion 204a, an angular portion 204b, and a flat portion 204c. When the rotor 204 rotates, the curved portion 204a and the angular portion 204b engage the lower surface of the guide 200 smoothly and joltingly. As the curved portion 204a and the angular portion 204b of the rotor 204 successively engage the guide 200, the toothed end of the guide 200 is gradually and abruptly displaced, thereby aligning a dropping film in coaction with the plate 201. When the flat portion 204c engages the guide 200, the guide 200 descends to release the teeth 200a through 200j out of mesh with the teeth 201a through 201j, allowing the film to drop off the guide 200.

Figure 1:
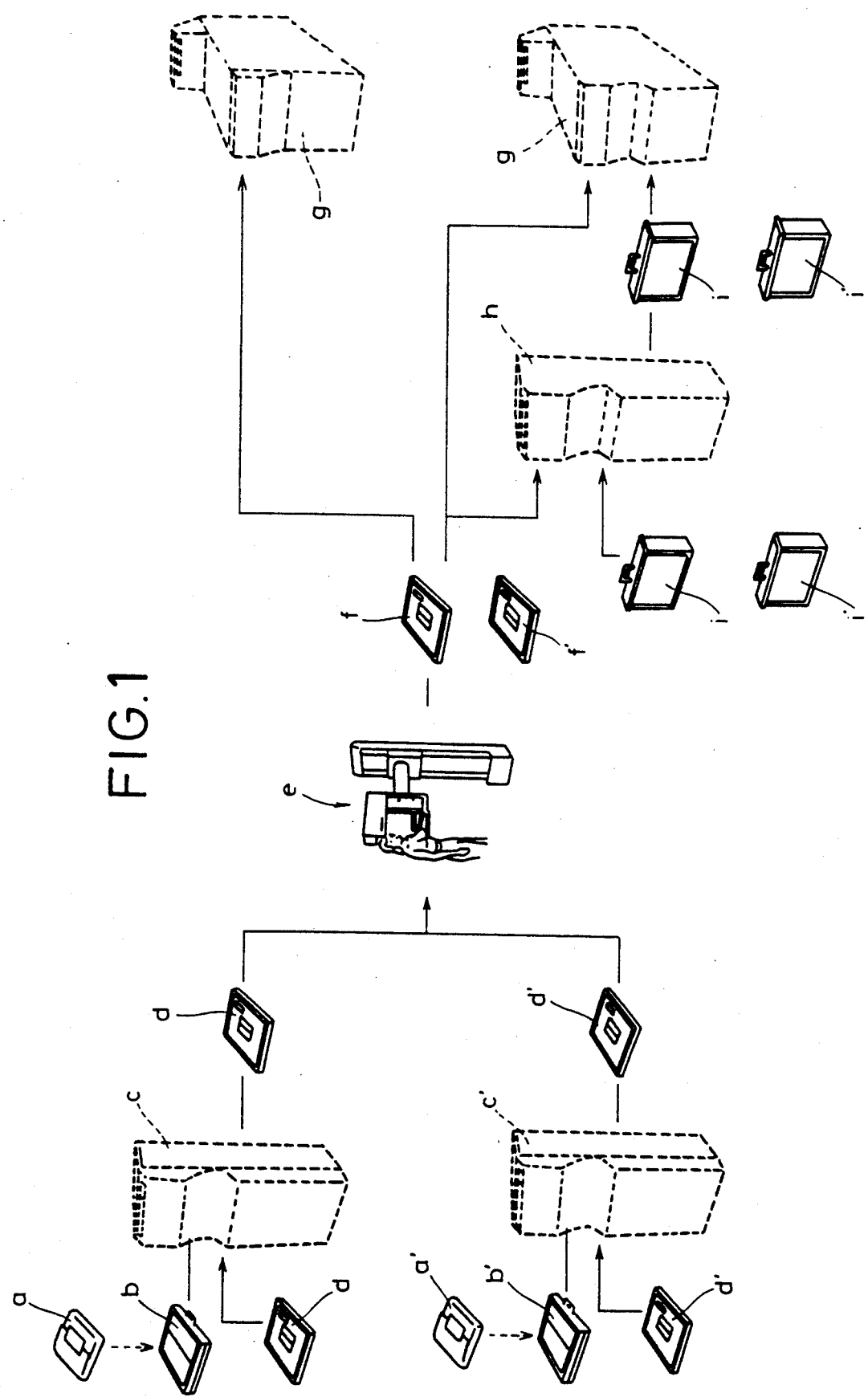
FIG. 1 is a diagram of a mammographic imaging system as a background of the present invention.

The toothed end of the guide 200 is positioned closely to the feed system 6. As shown in FIG. 1, the feed system 6 comprises a first group of rollers 206a, 206b, 206c, 206d, a second group of rollers 208a, 208b, 208c, a third group of rollers 210a, 210b, 210c, and endless belts trained around the first, second, and third roller groups, respectively. A guide 212 which is directed obliquely upwardly is positioned near the roller 206d. The guide 212 has a distal end directed toward the region where the rollers 210a, 206d rollingly contact each other. A roller pair 214 is located near the rollers 206c, 210b, and confronts the magazine accommodating mechanism 8.

The guide 212 comprises a flat portion 212a and an inclined portion 212b. The flat portion 212a serves to guide a film of narrower size, and the flat portion 212a and the inclined portion 212b jointly serve to guide a film of wider size. The guide 212 includes a raised portion which defines the inclined portion 212b, the raised portion serving to guide an end of a film of narrower size.

The magazine accommodating mechanism 8, which coacts with the film feeding and storing mechanism, is arranged to accommodate a magazine MZ by utilizing a recess 250 defined in one side of the housing 10. The housing 10 has an opening 252 defined in the bottom of the recess 250, and a magazine holder casing 254 is obliquely disposed in the housing 10 and extending inwardly from the opening 252.

Figure 7:
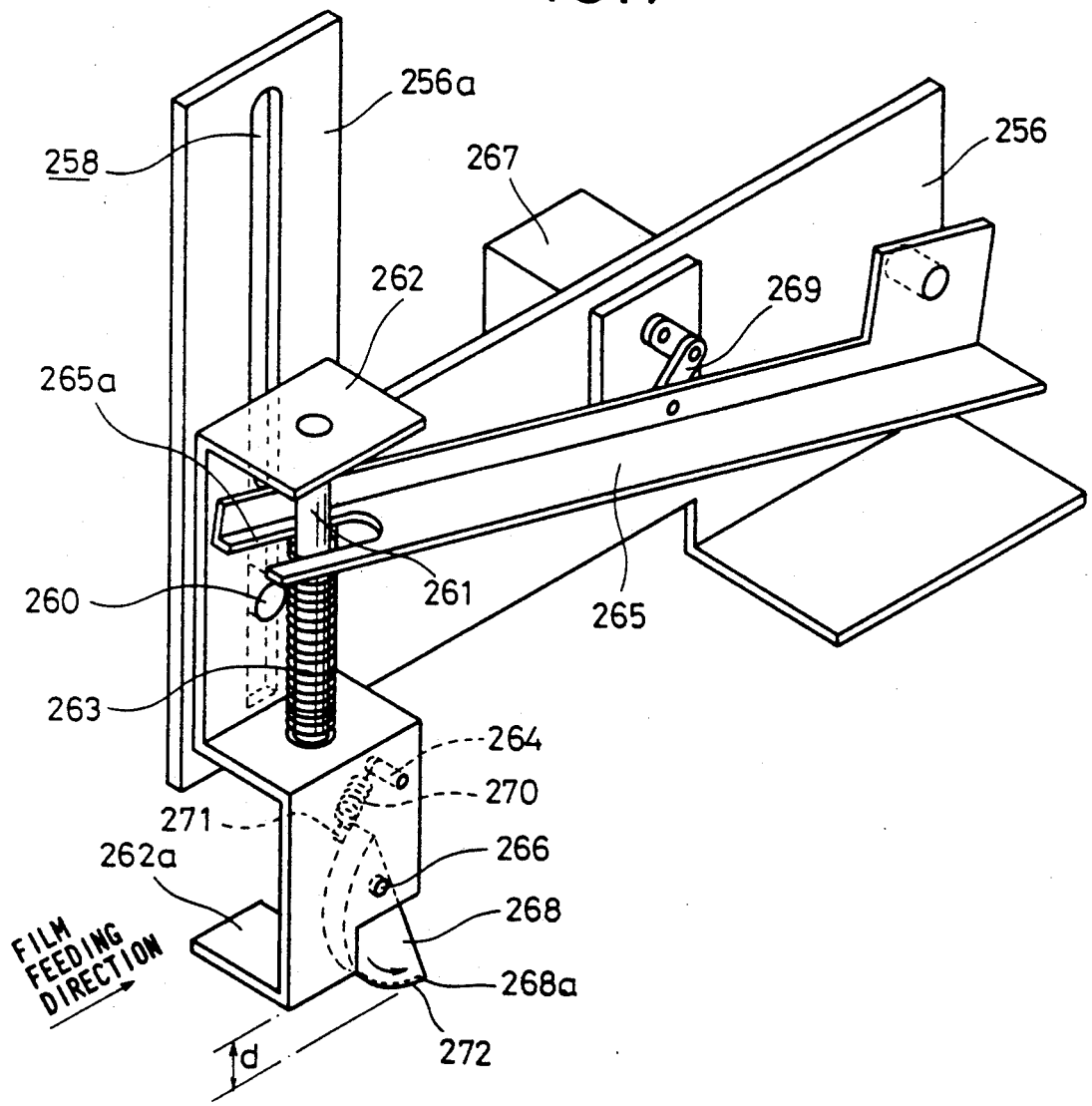
FIG. 7 is a perspective view of a magazine accommodating means in the film storage device.

The film feeding and storing mechanism will now be described below. A bent support plate 256 is mounted on an upper panel of the magazine holder casing 254 and includes a vertical portion 256a (FIG. 7) which has a slot 258 defined therein perpendicularly to the direction in which the magazine is inserted into the magazine holder casing 254. The slot 258 receives a roller 260 which is joined to a belt lever 262 having two bent portions between which a vertical guide rod 261 extends. A coil spring 263 is disposed around the guide rod 261 and has one end engaged by a swingable member 265 which has an U-shaped groove 265a defined in one end thereof and receiving the guide rod 261. The swingable member 265 is swingable about a pivoted end thereof remote from the groove 265a by a link mechanism 269 coupled to a motor 267. On the lever 262, there are also mounted a pin 264 near one of the two bent portions thereof and another pin 266 disposed below the pin 264.

A semicircular film feeder 268 is pivotally supported on the pin 266 and has one end engaged by one end of a coil spring 270 through a pin 271, the other end of the coil spring 270 being connected to the pin 264. The semicircular film feeder 268 has a frictional layer 272 of synthetic rubber or the like mounted on the curved surface thereof. The film feeder 268 is normally urged to turn downwardly about the pin 266 under the bias of the coil spring 270. The distal end of the semicircular film feeder 268, which is remote from the end engaged by the coil spring 270, is normally spaced downwardly from a bent end 262a of the lever 262 by a distance d.

The film storage device according to the present invention is basically constructed as described above. Operation and advantages of the film storage device will hereinafter be described.

A process of accommodating cassettes CS of different longitudinal and transverse sizes in the device 2 and automatically discharging the cassettes CS from the device 2 will first be described below. When a cassette CS of a larger size is to be introduced into the device 2, the lever 14 is laterally displaced to form a space in the housing 10 which matches the size of the cassette CS. More specifically, the displacement of the lever 14 is transmitted to the channel-shaped displaceable member 17. Since the displaceable member 17 engages the roller 116, the plate 66 is displaced and so is the movable guide 74, thus obtaining a desired space for the insertion of the cassette CS therein. At this time, the roller 84 supported on the angle 82 rolls on the plate 32, thereby allowing the plate 66 to be easily displaced. The bent portions 83a, 83b of the cassette displacement limiting member 83 are displaced out of engagement with the collars 100, 111, respectively. A distal end of the cassette displacement limiting member 83 laterally displaces the pin 70, which then moves in and along the slot 38 together with the pin 68. Therefore, the movable guide 74 is positioned with respect to the fixed guide 48 by the lever 14, so that the cassette CS with an exposed film loaded therein can be brought into the guide groove 46 of the fixed guide 48 and the guide groove 72 of the movable guide 74. If the distance between the fixed and movable guides 48, 74 is already adjusted to the cassette CS to be inserted, then it is not necessary to displace the lever 14.

The cassette CS of a larger size is now inserted through the opening 12 into the housing 10. The leading end of the cassette CS pushes the shutter 22 upwardly, and the shutter opening arm 27 is slightly displaced upwardly by the pin 26 mounted on the bracket 24. The cassette CS can then be inserted into the guide groove 46 of the fixed guide 48 and the guide groove 72 of the movable guide 74. At this time, the locking finger 78 is pushed upwardly by the leading end of the cassette CS. After the movable guide 74 has been displaced, since the plate 32 does not have a hole for receiving the locking finger 78 which is thus displaced, the movable guide 74 is not locked with respect to the cassette CS of this size. Particularly, the movable guide 74 is not required to be locked because it is limited against displacement by the attachment member 50. Further insertion of the cassette CS causes the leading end thereof to press the distal end of the sensor actuator 94. The sensor actuator 94 is therefore displaced in the direction indicated by the arrow in FIG. 4 against the tension of the coil spring 98. After the recess 95 of the sensor actuator 94 has moved past the sensor 102 by being pushed by the cassette CS, a predetermined portion of the sensor actuator 94 blocks passage of light toward the sensor 102 which comprises a photointerrupter.

The sensor 102 now produces an output signal which is sent to the motor 181 fixed to the side plate 28a. When the motor 181 is energized, the gear 182 (FIG. 3) coupled to the rotatable drive shaft of the motor 181 is rotated in the direction indicated by the arrow, causing the gear 183 to turn the drive fork 184. The rotative power applied to the drive fork 184 is transmitted through the shaft 185 to the drive fork (not shown) on the side of the attachment member 50. The fingers 187a, 187b of the drive forks 184 now forcibly displace the cassette holder 30, which includes the attachment members 40, 50, downwardly of the slots 56a, 56b. Therefore, the cassette CS gripped by the fixed and movable guides 48, 74 is also displaced downwardly. At this time, the pins 42b, 52b are displaced only linearly in and along the slots 56b, 58b, respectively.

Figure 5:
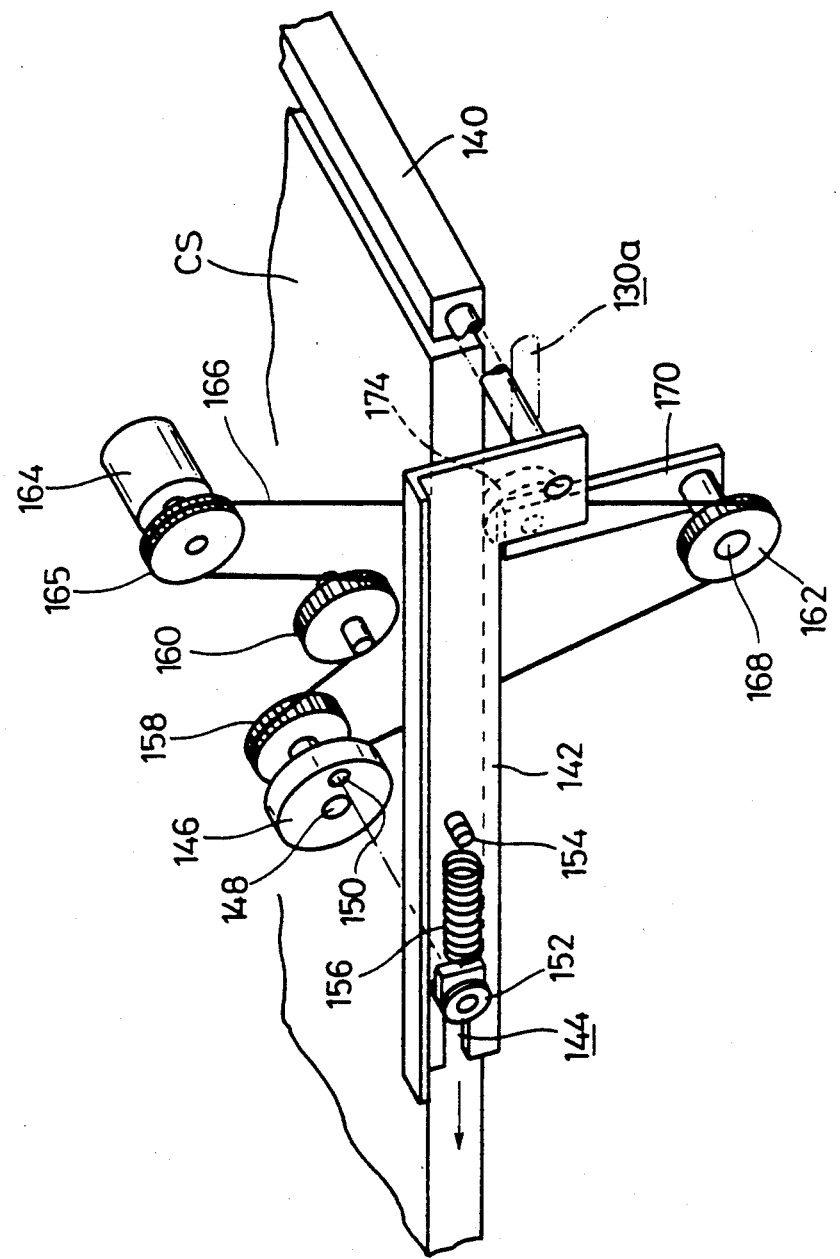
FIG. 5 is a perspective view of an unlocking mechanism in the film storage device.

The cassette holder 30, which has been displaced downwardy toward the curved ends of the slots 56a, 58a by the drive forks 184, is detected by a sensor (not shown). which produces a drive signal to energize the motor 164 (FIG. 5). The motor 164 then rotates the sprocket 165, which causes the chain 166 to rotate the sprockets 162, 158, 160 and also the link 146 which is coaxially coupled to the sprocket 158. Therefore, the eccentric pin 150 on the link 146 is rotated about the shaft 148, angularly displacing the arm 142 about the end of the unlocking bar 140 and also displacing the arm 142 in a direction toward the open end of the long groove 144.

At this time, the roller 152 rotatably supported on the pin 150 pulls the tension spring 156, and the arm 142 is displaced in the direction indicated by the arrow. The unlocking bar 140 supported in the slots 130a, 130b is displaced in unison with the arm 142, enabling the arm 142 to press the trailing end of the cassette CS thereby to hold the cassette CS securely.

Figure 8:
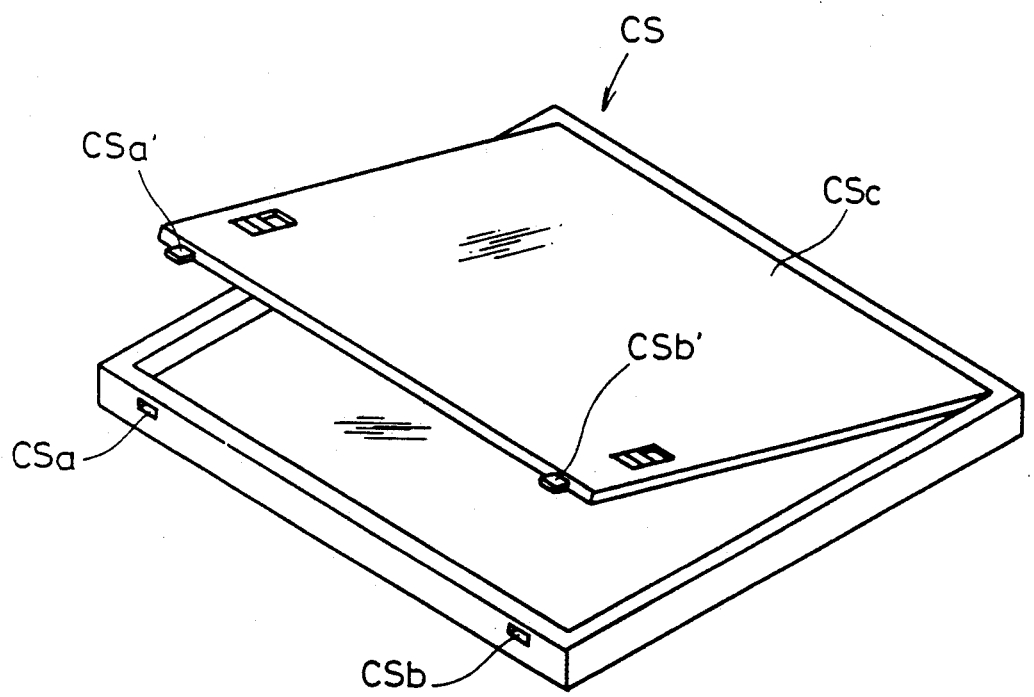
FIG. 8 is a perspective view of a cassette.

The unlocking pins 96, 112 are inserted respectively in through holes CSa, CSb (FIG. 8) defined in a body of the cassette CS, pushing locking members CSa', CSb' in a lid CSc of the cassette CS. Now, the cassette CS is unlocked. Since the link 170 for lifting the lid CSc of the cassette CS, which link 170 is pivotally coupled to the shaft 168 of the sprocket 162, is displaced downwardly, at this time, the lid closing plate 180 held against the roller 174 is angularly moved downwardly about one end thereof. As a result, the lid CSc of the cassette CS is tilted through the same angle as the angle through which the lid closing plate 180 is tilted, thereby opening the cassette CS. Accordingly, the film in the cassette CS drops due to gravity toward the guide 200. The downward displacement of the lid closing plate 180 is limited by the receiver pad 205 on the guide 200.

The film which has dropped from the lid closing plate 180 reaches the upper surface of the guide 200, and ha its leading end abutting against the plate 201 whose teeth 201a through 201j mesh with the teeth 200a through 200j of the guide 200. At this time, the rotor 204 supported on the rotatable shaft of the motor 207 has a portion remotest from its center, i.e., the curved portion 204a, held in abutment against the lower surface of the guide 200 (FIG. 6). The motor 207 is energized to rotate the rotor 204 so that the curved portion 204a and then the angular portion 204b are successively brought into contact with the guide 200.

When the flat portion 204c of the rotor 204 then contacts the lower surface of the guide 200, the guide 200 reaches its lowermost position. Now, the guide 200 and the distal end of the plate 201 are slightly spaced from each other. The rotor 204 thus imparts a vibratory action to the guide 200, so that the film on the guide 200 has its leading end positioned with respect to the plate 201.

Then, the feed system 6 is actuated. The film is gripped and fed toward the guide 212 by the belt around the first group of rollers 206a through 206d and the belt around the second group of rollers 208a through 208c. Since the guide 212 has a step between the flat portion 212a and the inclined portion 212b, the film which is of a larger size is placed on the guide 212 over the step. If the film is of a smaller size, the film is placed on the flat portion 212a below the step.

It should be noted that the film is placed upside down on the guide 212. The film is then removed from the guide 212, gripped between the belt around the first group of rollers 206a through 206d and the belt around the third group of rollers 210a through 210c, and fed toward the roller pair 214. At this time, a magazine MZ has already been inserted in the magazine holder casing 254, and an opening defined in a lower portion of the magazine MZ is large enough to receive the film.

The motor 267 is energized to lower the swingable member 265 (FIG. 7) through the link mechanism 269, whereupon the roller 260 riding in the slot 258 in the support plate 256 is displaced downwardly, so that the film which is fed from the feed system 6 is engaged by the curved edge of the film feeder 268. Upon continued energization of the motor 267, the roller 260 is displaced downwardly against the resiliency of the coil spring 263, forcing the film into abutment against the bottom panel of the magazine MZ or a stack of films already stored in the magazine MZ. Inasmuch as one end of the film feeder 268 is pulled by the coil spring 270, when the film feeder 268 abuts against the film upon downward displacement of the lever 262, the film feeder 268 is resiliently turned about the pin 266 in the direction indicated by the arrow. Therefore, reactive forces generated and applied to the film feeder 268 in response to forces imposed to the film by the film feeder 268 displace the film feeder 268 in the direction indicated by the arrow against the bias of the coil spring 270. The distal end 268a of the film feeder 268 is thus displaced in a direction to feed the film upwardly into the magazine MZ. The film is now pushed into the magazine MZ by the film feeder 268 and the end 262a of the lever 262 (see FIG. 7).

The above process is repeated to accommodate a stack of exposed films in the magazine MZ. After a desired number of films have been stacked in the magazine MZ, the magazine MZ is removed from the opening 252 in a light-shielding condition.

After the film has been taken out of the cassette CS, the cassette CS itself has to be unloaded from the housing 10. The cassette CS is automatically unloaded from the housing 10. More specifically, when the film is taken out of the cassette CS and fed toward the guide 200, the motor 164 is energized again. The link 170 is angularly moved to cause the roller 174 on the distal end thereof to angularly displace the flange 180a of the lid closing plate 180 upwardly, until the lid closing plate 180 pushes the lid CSc into the cassette CS. At this time, the sprockets 162, 158, 160 are also rotated by the chain 166, so that the roller 152 returns to its original position. The tension spring 156 is contracted, and the arm 142 is displaced back to its original position. The displacement of the arm 142 allows the unlocking bar 140 to return toward its original position within the range defined by the slots 130a, 130b. Therefore, the trailing end of the cassette CS which has been securely held so far by the unlocking bar 142 is now released and becomes displaceable.

The motor 181 is then reversed to cause the gears 182, 183 to angularly move the drive forks 184 backwards. Therefore, the cassette holder 30 is displaced along the slots 56a, 58a and 56b, 58b through the pins 42a, 52a and the pins 42, 52b, toward the opening 12. The rollers 44, 54 mounted on the pins 42a, 52a push the bent portion of the shutter opening member 27 upwardly, which is angularly displaced upwardly about its pivoted end. The pin 26 which engages the distal end of the shutter opening member 27 now causes the bracket 24 to open the shutter 22. The drive forks 284 are turned to further displace the cassette holder 30 toward the opening 12 along the slots 56a, 58a and 56b, 58b, whereupon the cassette CS held by the cassette holder 30 can easily be taken out from outside of the housing 10.

The film storage device 2 basically operates as described above. Now, a process of mounting a cassette of a different size, i.e., a smaller size, in the film cassette accommodating and unloading mechanism 4 will be described below.

The lever 14 is laterally displaced from outside of the housing 10 to move the movable guide 74 toward the fixed guide 48 so that the space therebetween matches the size of the cassette CS to be inserted into the housing 10, as indicated by the solid lines in FIG. 3. The displacement of the lever 14 also displaces the plate 66 which is integrally coupled to the movable guide 74.

The pin 68 is displaced with the pin 70 under the tension of the coil spring 64, the coil spring 90 pulls the pin 88, and the pin 108 reaches the position shown in FIG. 3 under the tension of the coil spring 110. Since the cassette displacement limiting member 81 is also displaced, the collars 100, 111 disposed on the respective plates 66, 104 enter the bent portions 83a, 83b, respectively, of the cassette displacement limiting member 81. The collars 100, 111 are now prevented from being displaced further.

When the cassette CS of smaller size is introduced into the housing 10 through the opening 12, it pushes the locking finger 78 upwardly about the pin 76, and the distal end of the locking finger 78 is inserted into the locking hole 80. The movable guide 74 and the plates 66, 104 are fixedly positioned. The unlocking pins 96, 112 on the plate 92 unlock the lid CSc of the cassette CS, which is then opened. The subsequent operation is the same as the operation described above with reference to the cassette CS of larger size.

A film storage checking process with respect to the magazine MZ will be described below with reference to FIG. 9.

An identification indicia group 342 (identification indicia group A) composed of two identification indicia 342a, 342b in the form of light-reflecting silver mats is applied to the reverse side of a cassette CS ($CS_1$ through $CS_3$). The film cassette mounting and discharging mechanism 4 has a detecting means 344 (detecting means A) comprising light sensors 344a, 344b positioned in confronting relation to the identification indicia 342a, 342b, respectively, on the cassette CS inserted in the film cassette accommodating and unloading mechanism 4.

An identification indicia group 346 (identification indicia group B) composed of two identification indicia 346a, 346b in the form of light-reflecting silver mats is applied to the reverse side of a magazine MZ ($MZ_1$ through $MZ_3$). The magazine accommodating mechanism 8 has a detecting means 348 (detecting means B, first detecting means) comprising light sensors 348a, 348b positioned in confronting relation to the identification indicia 346a, 346b, respectively, on the magazine MZ inserted in the magazine accommodating mechanism 8.

A shutter 350 is mounted in the magazine MZ below its face side and has an opening which can be opened and closed by the shutter 350. A detecting means 354 (detecting means C, second detecting means) comprising a light sensor is disposed in facing relation to the opening 352. A detecting means 356 (detecting means D, third detecting means) comprising a light sensor is disposed between the magazine accommodating mechanism 8 and the roller pair 214 which confronts the magazine accommodating mechanism 8.

The light sensors of the detecting means 344, 348, 354, 356 comprise photoreflectors each composed of a light-detecting element and a light-emitting element.

Output signals $S_1$ through $S_6$ produced from the light-emitting elements of the detecting means 344, 348, 354, 356 are applied to an A/D converter 362 in an input/output interface 360 of a microcomputer 358 (control means) in the device 2. If the output signals $S_1$ through $S_6$ have a level ("H" level) higher than a certain threshold preset in a RAM 364 in the microcomputer 358, then a CPU 366 in the microcomputer 358 determines that there are identification indicia 342a, 342b, 346a, 346b and a film F. If the output signals $S_1$, $S_2$ of the detecting means 344 are of an "L" level, then the CPU 366 determines that there is no cassette CS. If the output signals $S_3$, $S_4$ of the detecting means 348 are of an "L" level, then the CPU 366 determines that there is no magazine MZ. The output signals $S_1$ through $S_6$ becomes a "H" level when the intensity of reflected light detected by the light-detecting elements of the light sensors 344a, 344b, 348a, 348b and the light detecting means 354, 356 is higher.

Depending on the identification indicia 342a, 342b, 346a, 346b and the film F, an LCD (Liquid Crystal Display) 372 on the housing 10 which is electrically connected through an LCD driver 370 to the interface 360 displays predetermined indications according to a program stored in a ROM 368 in the microcomputer 358.

FIGS. 10a through 10d show display tables 374a, 374b, 374c, 374d stored in the RAM 364. The display tables 374a, 374b shown in FIGS. 10a and 10b represent the relationship between the levels of output signals from the light sensors 344a, 344b, 348a, 348b and the types of cassettes CS ($CS=CS_1$, $CS_2$, $CS_3$) and magazines MZ ($MZ=MZ_1$, $MZ_2$, $MZ_3$). The display table 374c shown in FIG. 10c indicates pairs of cassettes CS and magazines MZ which match each other, i.e., can hold films of the same size. The display table 374d shown in FIG. 10d represents the numbers X ($X_1$, $X_2$, $X_3$) of films that are stored and the maximum numbers Y ($Y_1$, $Y_2$, $Y_3$) of films that can be stored in the magazines $MZ_1$, $MZ_2$, $MZ_3$.

FIG. 11 shows a table 375 stored in the RAM 364 for determining whether there is a film F or not. The table 375 is used to control the table 374d such that when the output signal $S_6$ from the detecting means 356 goes high once (more accurately, when the output signal $S_6$ is shifted from an "L" level to a "H" level and then to an "L" level), the number X in the display table 374d is incremented by 1. The table 375 is also used to determine whether there is a film F or not in combination with the output signal $S_5$ from the detecting means 354.

The ROM 368 stores a control program for a film number control or checking process described below.

The film storage control or checking mechanism in the film storage device according to the present invention is basically constructed as described above. Operation of the film storage control or checking mechanism will be described below.

FIG. 12 shows a control program stored in the ROM 368 for controlling the CPU 366 to execute a film number control or checking process 400. The film number control or checking process 400 will now be described according to the program, which is repeatedly executed per unit period of time.

The operator (not shown) of the film storage device 2 switches on the power supply of the film storage device 2, and then sees the LCD 372 to confirm that no magazine MZ is inserted in the film storage device 2. Then, the operator inserts a magazine MZ with the shutter 350 closed into the magazine mounting mechanism 8 through the opening 252.

Then, the output signals $S_3$, $S_4$ from the light sensors 348a, 348b are read by the CPU 366 through the input/output interface 360 and the A/D converter 362 in a step 1.

Based on the levels of the output signals $S_3$, $S_4$, it is determined in a step 2 whether a magazine MZ is inserted or not with reference to the display table 374b (FIG. 10b) in the RAM 364. If the output signals $S_3$, $S_4$ have "L" levels, respectively, then since no magazine is inserted yet, the LCD 372 displays that no magazine MZ is inserted in a step 3. Then, the insertion of a magazine MZ is awaited.

If any one of the output signals $S_3$, $S_4$ from the light sensors 348$a$, 348$b$ goes high, it is determined that a magazine MZ is inserted in the step 2. It is assumed that the inserted magazine MZ is a magazine $MZ_3$ in this description.

Therefore, both the output levels $S_3$, $S_4$ have a "H" level, indicating that the type of the inserted magazine is $MZ_3$ in a step 4. The CPU 366 controls the LCD driver 370 through the input/output interface 360 to change the display on the LCD 372 from the message that no magazine MZ is inserted to the message that the magazine $MZ_3$ is inserted, and the CPU 366 also stores the information that the magazine MZ placed in the film storage device 2 is the magazine type $MZ_3$ at a given address in the RAM 364, in step 5.

After the type of the inserted magazine MZ is identified, the shutter 350 is opened in the direction indicated by the arrow A by a shutter opening/closing mechanism in the magazine accommodating mechanism 8 in step 6.

Then, the operator brings a cassette $CS_3$, which accommodates a film F, already exposed to X-ray radiation, and which matches the magazine $MZ_3$ displayed on the LCD 372, toward the opening 20 in the film storage device 2, opens the shutter 22, and mounts the cassette $CS_3$ in the film cassette mounting and discharging mechanism 4 in the film storage device 2. Before the cassette $CS_3$ is accommodated, the operator confirms that no cassette CS has already been mounted on the basis of the display on the LCD 372.

Then, the output signals $S_1$, $S_2$ of the light sensors 344$a$, 344$b$ are read by the microcomputer 358 in step 7, which is followed by step 8 that determines whether there is a cassette CS or not by referring to the display table 374$a$ (FIG. 10$a$) stored in the RAM 364. If the output signals $S_1$, $S_2$ are still of an "L" level, then the LCD 372 displays that there is no cassette CS in step 9, and the insertion of a cassette CS is awaited. In this embodiment, the mounted cassette CS is a cassette $CS_3$ as described above. Therefore, the levels of the output signals $S_1$, $S_2$ go high, indicating that the mounted cassette CS is a cassette $CS_3$ in step 10. The display on the LCD 372 is changed from the message that no cassette CS is mounted to the message that the cassette $CS_3$ is mounted in step 11. At the same time, the information that the cassette CS mounted in the film storage device 2 is a cassette $CS_3$ is stored at a given address in the RAM 364.

Then, step 12 determines whether or not the types of the cassette CS mounted in the film storage device 2 matches the type of the magazine MZ mounted in the film storage device 2, based on the display table 374$c$ (FIG. 10$c$) and the information about the magazine MZ and the cassette CS, which is stored at the given address in the RAM 364. If the types of the magazine MZ and the cassette CS do not match each other, then the unmatching of the magazine MZ and the cassette CS is displayed on the LCD 372 in step 13. In this case, the lid of the cassette $CS_3$ is controlled not to be opened, and the confirmation of the operator is awaited.

Since the cassette $CS_3$ and the magazine $MZ_3$ are mounted in the film storage device 2 at this time, control goes from the step 12 to step 14.

In the step 14, the output signal $S_5$ from the detecting means 354 positioned at the opening 352 in the magazine $MZ_3$ is read by the microcomputer 358. Then, step 15 determines whether there is a film F in the magazine $MZ_3$ or not by referring to the table 375 (FIG. 11) and the level of the output signal $S_5$. The output signal $S_5$ is of a "H" level when there is a film F in the magazine $MZ_3$.

If no film F is present in the magazine $MZ_3$, then the number $X_3$ of stored films in the display table 374$d$ stored in the RAM 364 is reduced to 0, and displayed on the LCD 372 in step 16.

If there is a film F in the magazine $MZ_3$, then the number $X_3$ of stored films in the display table 374$d$ is read and displayed on the LCD 372 in a step 17. Thereafter, step 18 determines whether the number $X_3$ of stored films is less than the maximum number $Y_3$ of films that can be stored in the magazine $MZ_3$ or not. If the number $X_3$ of stored films is equal to the number $Y_3$ of storable films, then that information is displayed on the LCD 372 in step 19, indicating to the operator that the magazine $MZ_3$ should be replaced, or replacement of the magazine $MZ_3$ is awaited.

If the number $X_3$ of stored films is less than the number $Y_3$ of storable films, then the unlocking pins 96, 112 (see FIG. 4) of the cassette opening and closing mechanism open the lid CSc of the cassette $CS_3$ in a step 20.

Figure 9:
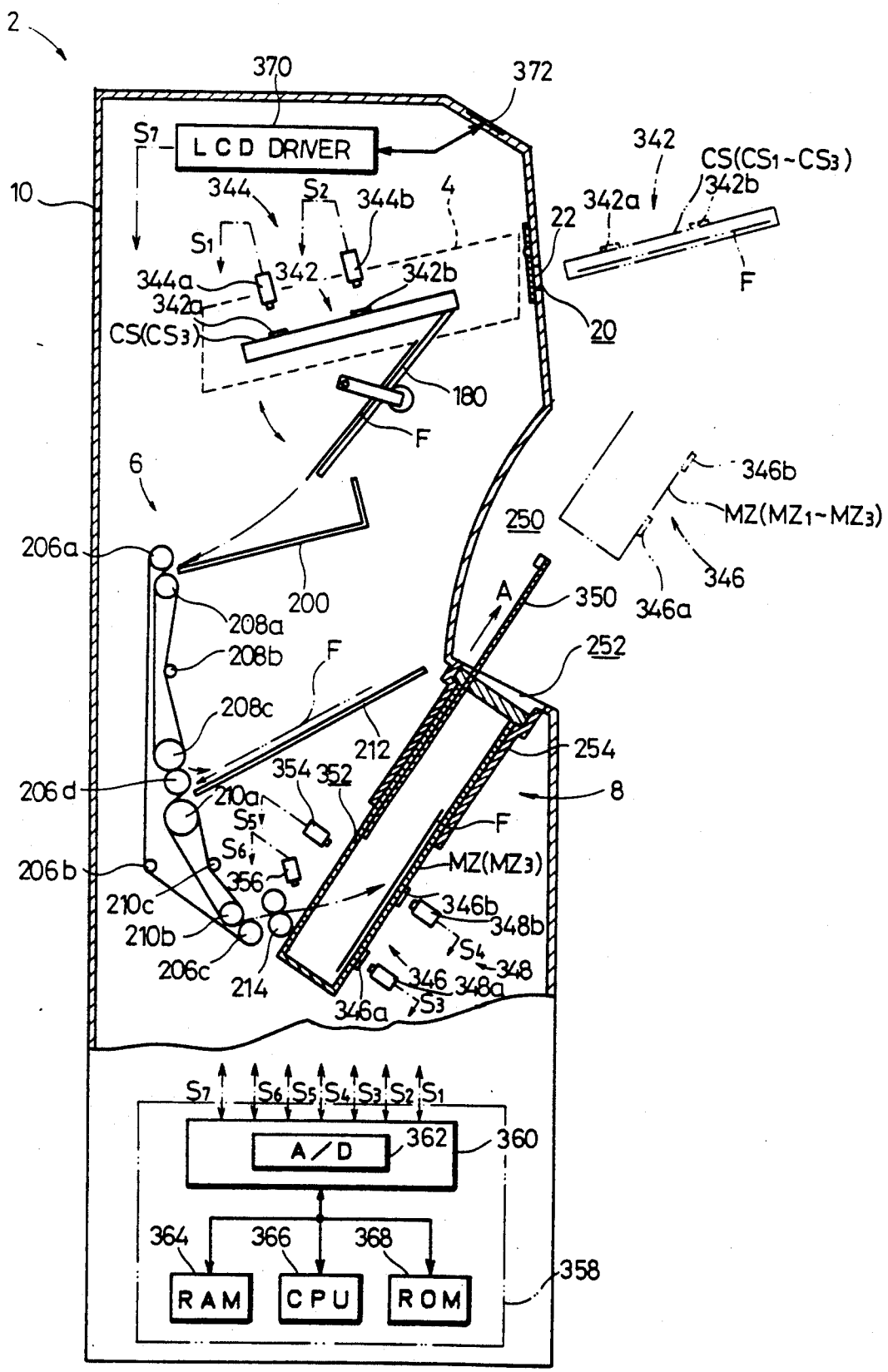
FIG. 9 is a vertical cross-sectional view of the film storage device, which incorporates a film storage checking mechanism.

The film F now drops from the cassette $CS_3$ as indicated by the dot-and-dash line in FIG. 9, is guided by the guide 200 to enter between the rollers 206$a$, 208$a$, and is discharged from the rollers 206$a$, 208$a$ onto the guide 212, on which the film F is placed upside down or reversed. Then, the film F is introduced between the rollers 206$d$, 210$a$, and fed by the rollers 210$b$, 106$c$ and the roller pair 214 into the magazine $MZ_3$ in step 21.

When the film F passes between the roller pair 214 and the opening 352 in the magazine $MZ_3$, the output signal $S_6$ of the detecting means 356 goes high in level, and is applied to the microcomputer 358. When the passage of the film F is confirmed according to the table 375, the number $X_3$ of films stored in the magazine $MZ_3$ is incremented by 1 ($X_3+1$) in step 22. When the film F is stored in the magazine $MZ_3$, the cassette opening and closing mechanism is operated to close the lid CSc of the cassette $CS_3$, which is then discharged out of the film storage device 2 by the film cassette mounting and discharging mechanism 4. Another cassette $CS_3$ with an exposed film F placed therein is then mounted in the film storage device 2 by the operator.

After all desired films F are stored in the magazine $MZ_3$, the shutter 350 of the magazine $MZ_3$ is closed. The magazine $MZ_3$ is then removed from the film storage device 2, and placed into an automatic developing machine (not shown), in which the images on the exposed films F are developed for diagnostic use, for example.

In this embodiment, the LCD 372 displays the information as to whether there is a cassette CS in the film storage device 2, the type of a cassette CS in the film storage device 2, the information as to whether there is a magazine MZ in the film storage device 2, the type of a magazine MZ in the film storage device 2, and the number of films F stored in the magazine MZ.

Therefore, by confirming the displayed information, the operator can reliably mount a cassette CS which matches a magazine MZ mounted in the film storage device 2, avoiding a mismatch between the types of a mounted cassette CS and a mounted magazine MZ.

Since the number of films stored in the magazine MZ can be confirmed, no excessive films will be placed into the magazine, and hence films will not be jammed in the magazine.

With the present invention, as described above, a film is fed by the feed system and forcibly placed into the magazine which is open in its lower portion and is slightly inclined. The film feeder comprises a rotatable semicircular member which is pressed against the film and is turned to apply a force to the film in the direction in which to feed the film into the magazine.

Therefore, the film can reliably be delivered into the magazine, and pressed in the magazine. When the magazine is taken out of the film storage device and loaded in the automatic developing machine, the films in the magazine have already been aligned at their leading ends. Thus, no process is required to align the films as in the conventional systems.

The film storage device according to the present invention is simple in construction and small in size. Inasmuch as the film storage device operates mechanically, it is relatively free of failures and hence is reliable in operation.

The film storage device can identify a plurality of types of cassettes and a plurality of corresponding types of magazines, and can also store the number of films accommodated in magazines.

The display unit on the film storage device can display the types of a cassette and a magazine placed in the film storage device and the number of films accommodated in the magazine. The operator can avoid an erroneous operation by referring to the displayed information.

In the above embodiment, the types of cassettes depending on the sizes of films stored therein and the types of corresponding magazines are automatically checked. However, the present invention is not limited to the illustrated control or checking process, but may be modified in various ways. For example, the types of cassettes depending on kinds (sensitivity or the like) of films stored therein and the types of corresponding magazines may also automatically checked according to the present invention.

Although a certain preferred embodiment has been shown and described, it should be understood that many changes and modifications may be made therein without departing from the scope of the appended claims.

What is claimed is:

1. A film storage device comprising:
    a magazine for storing a plurality of films; and
    accommodating means for accommodating said magazine therein;
    said magazine having an identification indicia for identifying the type of the magazine;
    said accommodating means comprising:
    first detecting means for detecting the identification indicia on said magazine;
    second detecting means for detecting whether a film is stored in said magazine or not;
    third detecting means for detecting a film when the film is placed in said magazine;
    memory means for storing the number of films stored in said magazine; and
    control means, electrically connected to said first, second, and third detecting means and responsive to output signals from said first, second, and third detecting means, for storing the number of films in said magazine in said memory means.

2. A film storage device comprising:
    a cassette for storing a single film; and
    a magazine for storing a plurality of films, said magazine corresponding in type to said cassette;
    accommodating means for accommodating said cassette and said magazine therein;
    said cassette having an identification indicia A for identifying the type of the cassette;
    said magazine having an identification indicia B for identifying the type of the magazine;
    said accommodating means comprising:
    detecting means A for detecting the identification indicia A on said cassette;
    detecting means B for detecting the identification indicia B on said magazine;
    detecting means C for detecting whether a film is stored in said magazine or not;
    detecting means D for detecting a film when the film is transferred from said cassette to said magazine;
    memory means for storing the number of films stored in said magazine; and
    control means, electrically connected to said detecting means A, B, C, D and responsive to output signals from said detecting means A, B, C, D, for detecting a mismatch between the types of the cassette and the magazine and for storing the number of films in said magazine in said memory means.

3. The film storage device of claim 2, wherein both said identification indicia A and B are light-reflecting mats mounted on said cassette and said magazine, respectively, and wherein each of said detecting means A, B, C and D are light sensors for sensing reflected light.

4. The film storage device of claim 3, wherein said memory means further stores the maximum number of films that may be stored in said magazine based upon the type of magazine.

5. The film storage device of claim 4, further comprising transfer means, coupled to said control means, for transferring the film from said cassette to said magazine, said control means activating said transfer means to transfer the film when a match between the type of the cassette and the type of magazine is detected.

6. The film storage device of claim 4, further comprising transfer means, coupled to said control means, for transferring the film from said cassette to said magazine, said control means activating said transfer means to transfer the film when the number of films stored in said magazine is less than the maximum number of films that may be stored.

7. The film storage device of claim 2 further comprising a display means for displaying the number of films stored in said magazine, and for displaying a detected mismatch between the type of cassette and the type of magazine.

8. A film storage device for use in imaging systems that utilize a plurality of different types of cassettes for storing film, and a plurality of different types of magazines each for storing a plurality of films, the storage device comprising:
    a cassette lading mechanism that receives a cassette storing a film;
    a cassette type detecting device, coupled to said cassette loading mechanism, detecting the type of cassette loaded in said cassette loading mechanism;
    a transfer mechanism that removes said exposed film from said loaded cassette;

a magazine loading mechanism that receives a magazine and holds said magazine in a position to receive film removed by said transfer mechanism;

a magazine detecting device, coupled to said magazine loading mechanism, detecting the type of magazine loaded in said magazine loading mechanism;

a film transfer detecting device that detect the transfer of film from said cassette to said magazine; and a control device that determines compatibility between a loaded cassette and a loaded magazine based upon the respective types of cassette and magazine detected by said cassette type detecting device and said magazine detecting device, respectively, wherein upon detection of compatibility, said control device activates said transfer mechanism to transfer film from the loaded cassette to the loaded magazine.

* * * * *